United States Patent
Sakata

[11] 4,089,590
[45] May 16, 1978

[54] ZOOM LENS BARREL HAVING MACRO-PHOTOGRAPHING MECHANISM

[75] Inventor: Shigeyoshi Sakata, Sakai, Japan

[73] Assignee: Minolta Camera Kabushiki Kaisha, Osaka, Japan

[21] Appl. No.: 725,742

[22] Filed: Sep. 23, 1976

[30] Foreign Application Priority Data

Oct. 6, 1975 Japan .................. 50-119818

[51] Int. Cl.$^2$ .................. G02B 15/16; G02B 15/18
[52] U.S. Cl. .................... 350/187; 350/255
[58] Field of Search .................... 350/187, 255

[56] References Cited

U.S. PATENT DOCUMENTS

| | | | |
|---|---|---|---|
| 3,731,987 | 5/1973 | Iida et al. | 350/187 |
| 3,784,285 | 1/1974 | Watanabe et al. | 350/187 |
| 3,817,600 | 6/1974 | Watanabe et al. | 350/187 X |
| 3,891,310 | 6/1975 | Hideo et al. | 350/187 |

*Primary Examiner*—Paul A. Sacher
*Attorney, Agent, or Firm*—Wolder, Gross & Yavner

[57] ABSTRACT

A zoom lens barrel having a macro-photographing mechanism including a main barrel carrying a control ring assembly which is divided into a first operating ring rotatable and slidable relative to the main barrel along the optical axis thereof, and a second operating ring movable with the first operating ring along the optical axis, the second operating ring being rotatable about the optical axis relative to the first operating ring. The rotation of the first operating ring effects the focusing of a lens system for ordinary photography, and the slide movement of the first operating ring effects zooming by causing a cam ring integral with the second operating ring to follow said movement, whereby when the cam ring is positioned at the wide-angle end or the telephoto end in zooming, the cam ring effects focusing of the lens system for macro-photography due to the rotation of the second operating ring relative to the first operating ring.

12 Claims, 5 Drawing Figures

ZOOM LENS BARREL HAVING MACRO-PHOTOGRAPHING MECHANISM

BACKGROUND OF THE INVENTION

The present invention relates to improvements in zoom lenses and it relates more particularly to an improved zoom lens which may operate as an objective lens system for macro-photography of the type, in which an objective lens system includes at least two movable components which are movable so as to effect selective magnification. In this lens system, the focusing for macro-photography is effected by adjusting the position of one component relative to another into a position different from that taken upon zooming, with the order of arrangement of the aforesaid movable components within the system being maintained unchanged, or by moving the lens components which have been maintained stationary during zooming.

A zoom lens system having a macro-photographing mechanism of the type described above is known, such as in the Japanese Patent Publication No. SHO50-28829, in which a single operating ring is moved along the optical axis relative to a fixed lens barrel, either upon zooming or upon focusing for macro-photography.

The prior art zoom lens barrel has the following shortcomings:

(1) Fine adjustment is difficult in focusing for macro-photography.

(2) Because of a single operation, discrimination between the macro-focusing operation and the zooming operation is difficult, thus presenting the possibility of a faulty operation.

(3) Machining of the cam ring is difficult and the construction of the lens barrel is complex, so that its cost is increased and its reliability is reduced.

(4) Rapid switching from a zooming operation to a macro-focusing operation and vice-versa is difficult to achieve.

SUMMARY OF THE INVENTION

It is a principal object of the present invention to provide an improved zoom lens which may be focussed for macro-photography.

It is another object of the present invention to provide a zoom lens barrel which allows distinct discrimination in operation between a zooming and a macro-focusing mode, thereby eliminating any faulty operation.

It is still another object of the present invention to provide a zoom lens barrel which allows quick switching from a zooming operation to a macro-focusing operation.

It is yet another object of the present invention to provide a zoom lens barrel which is simple in construction, low in manufacture cost and high in precision.

A further object of the present invention is to provide a device of the above nature characterized by its high reliability, convenience of operation, ruggedness and high versatility and adaptability.

The above and other objects of the present invention will become apparent from a reading of the following description taken in conjunction with the accompanying drawing which illustrates preferred embodiments thereof.

In a sense, the present invention comtemplates the provision of a zoom lens which is adjustable to effect focusing for macro-photography, in which an operating ring is rotatable about and slidable along the optical axis relative to a fixed lens barrel; and the operating ring is divided into a first operating ring and a second operating ring; the movement of the first operating ring along the optical axis is transmitted to the second operating ring, while the second operating ring is allowed to rotate about the optical axis relative to the first operating ring; the rotation of the first operating ring about the optical axis effects focusing for normal photography; and the slide or longitudinal movement of the first operating ring along the optical axis causes a cam ring to follow the aforesaid movement for a zooming operation through the medium of the second operating ring, while the rotation of the second operating ring at the wider-angle end or telephoto end in zooming relative to the first operating ring causes the cam ring to cooperate with the second operating ring to follow the aforesaid rotation so as to effect focusing for macro-photography.

DESCRIPTION OF THE PREFERRED EMBODIMENTS

Figure 1:
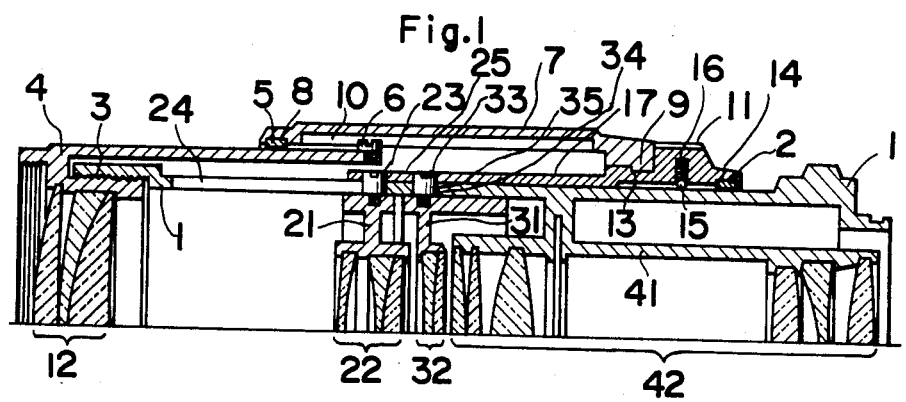
FIG. 1 is a medial longitudinal cross-sectional view, partly fragmented of one embodiment of a zoom lens barrel having a macro-photographing mechanism according to the present invention, showing the upper half thereof with respect to the optical axis.
Figure 2:
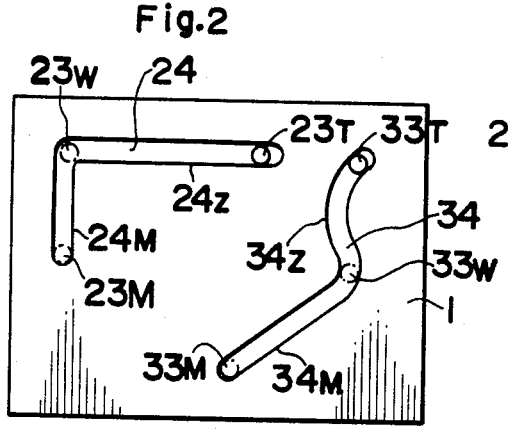
FIG. 2 is a side view of the fixed lens barrel and the cam slots provided therein, in the embodiment of FIG. 1.
Figure 3:
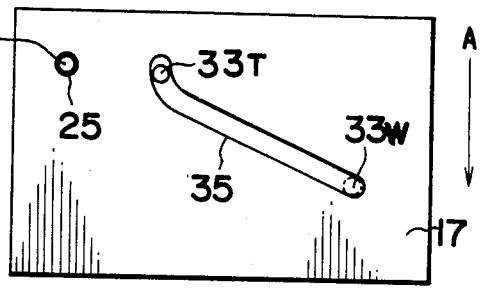
FIG. 3 is a side view of the cam ring used in the aforesaid embodiment and the cam slots provided therein.

Referring now to FIGS. 1 to 3 which illustrates one embodiment of the present invention, a fixed lens barrel 1 mounted to a camera, as shown in FIG. 1, includes a master lens sleeve or frame 41 which is rigidly mounted therein and carries or retains a master lens group 42 coaxially within the inner periphery thereof. Provided in the inner peripheral surface of the fixed lens barrel 1, as shown in FIG. 2, are a cam slot 24z for use in zooming and a cam slot 24M for use in macro-focusing, which slot 24M joins and is continuous with the slot 24z, and a cam slot 34z for use in zooming and a cam slot 34M for use in macro-focusing joining cam slot 34z. In addition, formed in the front end of the fixed lens barrel 1 is a helicoid 3 which is in threaded engagement with a rotatable ordinary focus-adjusting cylinder 4.

The focus-adjusting cylinder 4 carries or retains a focus-adjusting lens group 12 on its front inner peripheral surface, and its outer wall extends rearwardly to loosely fit on the outer periphery of the fixed lens barrel 1. A follower defining pin 6 is anchored to the rear end of the outer wall of the focus-adjusting cylinder 4 and radially outwardly projects therefrom.

A first operating ring 7 includes in its forward inner peripheral surface an annular groove 8, in which an inwardly projecting annular member 5 is fitted, and a linear groove 10 which is longitudinally slidably engaged by the pin 6 and which extends parallel to the optical axis. The first operating ring 7 is fitted at its forward part on the outer peripheral surface of the focus-adjusting cylinder 4. The annular engaging member 5 is made of a friction cloth and softly contacts the outer peripheral surface of the focus-adjusting cylinder 4. An annular projection 9 is formed on the rear inner peripheral surface of the first operating ring 7, and rotatably matingly engages an annular groove 13 provided in the outer peripheral surface of the second operating ring 11, the annular groove 13 extending at a right angle to the optical axis. An annular groove 14 is provided in the rear inner peripheral surface of the second operating ring 11 and contains an annular engaging member 2 which is made of a friction cloth and softly contacts the outer surface of the fixed lens barrel 1. A click ball 15 is fitted in a radial bore provided in the inner peripheral surface of the second operating ring 11 and is urged against the outer peripheral surface of the barrel 1 under the action of a spring 16 housed in the bore. The front portion of the second operating ring 11 defines a cam ring 17 which is closely rotatably and slidably fitted on the outer peripheral surface of the fixed lens barrel 1. Provided in the peripheral surface of the cam ring 17 are a hole 25 and a cam slot 35, as shown in FIG. 3.

A first movable lens group frame 21 which carries or retains a first movable lens group 22 for use in zooming is closely fitted in the inner peripheral surface of the fixed lens barrel 1 in sliding relation thereto. A follower defining pin 23 is anchored to the outer peripheral surface of the first movable lens frame 21 and slidably engages the cam slot 24M for use in macro-photography as well as the cam slot 24z for use in zooming, the pin 23 matingly engaging the hole 25 provided in the cam ring 17 as well.

A second movable lens frame 31 carries or retains a second movable lens group 32 for use in zooming. The second movable lens group frame 31 is closely fitted in the inner peripheral surface of the fixed lens barrel 1 in sliding relation thereto. A follower defining pin 33 is anchored to the outer peripheral surface of the second movable lens frame 31 and engages in the cam slot 34z and cam slot 34M provided in the fixed lens barrel 1 in piercing relation, the pin 33 engaging cam slot 35 provided in the cam ring 17 as well.

In operation, when the first operating ring 7 is rotated about the optical axis, then the focus adjusting cylinder 4 having the follower pin 6 slidably engaging the linear groove 10 is also rotated so that the focus-adjusting cylinder 4 moves along the optical axis relative to the fixed lens barrel 1 with the aid of the helicoid 3 formed therein, with the result that the position of the focus-adjusting lens group 12 is adjusted along the optical axis relative to a master lens group 42, thereby adjusting the focusing for an object distance in ordinary photography. During this operation, rotation is not transmitted to the second operating ring 11 through the annular projection 9 and annular groove 13, and thus the second operating ring 11 is locked in position by means of the click mechanism. There thus results no movement of the first and second movable lens frames 21, 31 along the optical axis.

When the first operating ring 7 is longitudinally slid or moved along the optical axis with the follower pin 23 engaging the cam slot 24z and the pin 33 fitted in the cam slot 34z, then the cam ring 17 longitudinally slidably moves along the optical axis through the medium of the second operating ring 11 so that the first movable lens frame 21 moves longitudinally along the optical axis by the aid of the hole 25, and the pin 23 slidingly moves along the cam slot 24z. On the other hand, the follower pin 33 on the second movable lens frame 31 engages both the cam slot 34z and the cam groove 35 all the time, so that the pin 33 is slidably rotated so as to be positioned at an intersection of the slot 34z and groove 35, thereby adjusting the positions of the first movable lens group 22 and second movable lens group 32 relative to the lens group 12, 42 for effecting zooming. More particularly, upon zooming, the follower pin 23 provided on the first movable lens frame 21 moves along the cam slot 24z provided in the fixed lens barrel 1 under the influence of the cam ring 17, while the follower pin 33 provided on the second movable lens frame moves along the cam slot 34z provided in the fixed lens barrel 1 under the urging of the cam ring 17. In other words, when set to a telephoto position in zooming, the pin 23 is positioned at 23T in the cam slot 24z, and the pin 33 is positioned at 33T in the cam slot 34z. When set to a wide angle position, the follower pin 23 is positioned at 23W in the cam slot 23z, while the follower pin 33 is positioned at 33W in the cam slot 34z.

Upon focusing for macro-photography, when the follower pin 23 fitted in the hole 25 is at the wide angle end in the aforesaid zooming operation and is positioned at the bend or connecting portion of the cam slot 24z and the cam slot 24M, i.e., at 23W in FIG. 2, and the follower pin 33 is positioned at the connecting point of the cam slot 34z and the cam slot 34M, i.e., at 33W in FIG. 2, then the rotation of the second operating ring 11 in the direction of arrow A as shown in FIG. 3 relative to the first operating ring 7 causes the follower pin 23 to be guided by means of the hole 25 and cam slot 24M, and causes the follower pin 33 to be guided by the cam slot 34M and cam groove 35, with the result that the pin 23 is positioned at 23M, while the pin 33 is positioned at 33M as shown in FIG. 2. As a result, the second movable lens group 32 is moved along the optical axis as carried by the second movable lens frame 31 and as determined by the movement of the point of intersection of cam slots 34M and 35.

Meanwhile, in the case of the first embodiment, there is shown a lens barrel for use in a lens system of the type in which when the lens system is to be focused for macro-photography, the first movable lens group 22 does not move along the optical axis relative to the master lens group 42, while the second movable lens group 32 alone moves. In this case, it suffices that the cam slot 24M may be an arcuate linear slot provided along the barrel circumference and lying in a plane perpendicular to the optical axis, and the cam slot 24z may be a linear longitudinally slot intersecting at a right angle therewith. As a result, the provision of the cam slot 24M and cam slot 24z may be greatly facilitated.

Figure 4:
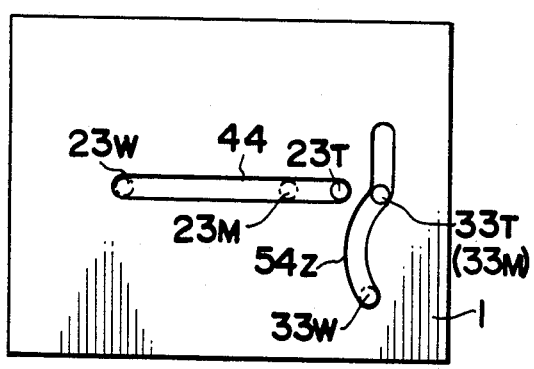
FIG. 4 is a side view of the fixed lens barrel in the second embodiment of the present invention, and the cam slots provided therein.
Figure 5:
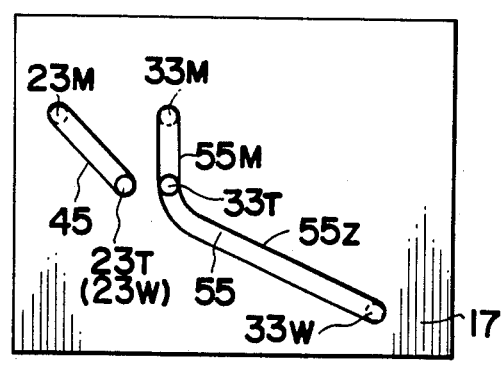
FIG. 5 is a side view of the cam ring used in the embodiment of FIG. 4 and the cam slots provided therein.

FIGS. 4 and 5 show a second embodiment of the present invention, in which there are provided cam slots in a lens system of the type, that upon focusing for macro-photography, the first movable lens group 22 moves and, in addition, the second movable lens group 32 moves in a manner different from that in a zooming operation.

In this case of it suffices that a cam slot 44, the fixed lens barrel 1 with which the pin 23 on the first movable lens frame 21 within the fixed lens barrel 1 engages may be a linear slot extending parallel to optical axis and the hole 25 provided in the cam ring 17 is replaced by a cam slot 45 inclined relative to a circumferential groove perpendicular to the optical axis. On the other hand, the cam slot, which is slidably engaged by the follower pin 33 on the second movable lens frame 31 may be the combination of a cam slot 54M for use in macro-focusing and a cam slot 54z for use in zooming which slot 54M joins and is continuous with the slot 54M, while the cam slot provided in the cam ring 17 may be the combination of a cam slot 55M for use in macro-focusing, and a cam slot 55z for use in zooming.

As is clear from the foregoing, when the follower pin 33 on the second movable lens frame 31 is positioned in the cam slot 54z as well as in the cam slot 55z, zooming may be effected due to the movement of the first operating ring 7 along the optical axis. On the other hand, when the pin 33 is positioned at the connection point 33T of the cam slot 54z with the slot 55M, focusing for macro-photography may be effected due to rotation of the second operating ring 11 relative to the first operating ring 7.

While there has been described and illustrated preferred embodiments of the present invention, it is apparent that numerous alterations, additions and omissions may be made without departing from the spirit thereof.

I claim:

1. A zoom lens mechanism which effects zooming and macro-focusing by means of lenses including focusing lenses and a magnifying lens group, comprising:
    a fixed lens barrel;
    a first carrying means movable along an optical axis and carrying focusing lenses;
    a second carrying means movable along said optical axis and carrying a magnifying lens group;
    a first operating means exteriorly manually operable, movable along and rotatable about said optical axis;
    a second operating means movable along said optical axis in cooperation with the movement of said first operating means along the optical axis, and manually exteriorly rotatable;
    a first transmitting means for moving of said first carrying means when said first operating means is rotated;
    magnification-setting means for moving said second carrying means for magnification when said second operating means is moved due to the movement of said first operating means along said optical axis; and
    macro-focusing setting means for setting said second carrying means to a macro-focusing position when said second operating means is rotated.

2. A zoom lens barrel as set forth in claim 1, wherein said magnifying lens group includes a front lens group and a rear lens group, said second carrying means consisting of a first lens frame carrying said front lens group and a second lens frame carrying said rear lens group.

3. A zoom lens barrel as set forth in claim 2, wherein said first operating means includes a barrel; said first carrying means includes a cylinder; and said first transmitting means includes a sleeve groove provided in the inner peripheral surface of said barrel and a pin provided on said cylinder and engaging said sleeve groove.

4. A zoom lens barrel as set forth in claim 3, wherein said second operating means includes a cylindrical ring and a cam ring integral with said cylindrical ring; and said magnification setting means and said macro-focusing setting means include cam slots provided in said fixed lens barrel and said cam ring, and pins which are provided on said first and second lens frames and engage said cam slots.

5. A zoom lens barrel as set forth in claim 4, wherein a bore is provided in the inside face of said cylindrical ring, and a click ball registers with said bore and is urged under the action of a spring against the outer peripheral surface of said fixed lens barrel.

6. A zoom lens barrel as set forth in claim 5, wherein an inwardly directed projection is formed on the rear inner peripheral surface of said barrel of said first operating means and a groove is provided in the outer peripheral surface of said cam ring in engagement with said projection.

7. A zoom lens adjustable for macro-photography comprising:
    a main barrel mountable to a camera;
    a first focusing lens carried by and axially movable relative to said main barrel;
    a magnification varying and macro-photography focusing lens system including a pair of second and third lenses supported by and axially movable relative to said main barrel;
    a first control member supported by said barrel and longitudinally movable and coaxially rotatable relative to said barrel;
    a second control member longitudinally movable with and rotatable relative to said first control member;
    transmission means coupling said first and second control members to said second and third lenses for varying the magnification and effecting the macro-photography focusing of said lens system with the axial movement of said first control member and the rotation of said second control member; and
    means coupling said first focusing lens and said first control member for axially moving said first focusing lens with the rotation of said first control member.

8. The zoom lens of claim 7 wherein said second and third lenses are axially movable in response to the longitudinal movement of said first control member to effect the zooming of said zoom lens.

9. The zoom lens of claim 7 wherein said third lens moves axially in response to the rotation of said second control member.

10. The zoom lens of claim 7 including first and second support members carrying said second and third lenses respectively and axially slidably and rotatably telescoping said main barrel, said transmission means comprising first and second stationary cam tracks located in said main barrel, a third cam track intersecting said second cam track and movable with said second control member, means intercoupling said first support member and said second control means, a first follower projecting from said first support member and engaging said first cam track and a second follower extending from said second support member and engaging said second and third cam track at their point of intersection.

11. The zoom lens of claim 10 wherein said intercoupling means comprises a member movable with said second control member and carrying said third cam track and having an aperture formed therein engaged by said first follower.

12. The zoom lens of claim 10 wherein said intercoupling means comprises a fourth cam track intersecting said first cam track and engaged by said first follower.

* * * * *